(12) United States Patent
Droste et al.

(10) Patent No.: US 8,995,947 B2
(45) Date of Patent: Mar. 31, 2015

(54) CONFIGURATION OF DISPLAY SETTINGS FOR BROADCAST MESSAGING WHILE ROAMING

(75) Inventors: Scott T Droste, Crystal Lake, IL (US); Howard P Benn, Swindon (GB); Jian Jun Wu, Reading (GB)

(73) Assignee: Google Technology Holdings LLC, Amphitheatre Parkway ( * ) Notice: Subject to any disclaimer, the term of this patent is extended or adjusted under 35 U.S.C. 154(b) by 99 days.

(21) Appl. No.: 13/553,927

(22) Filed: Jul. 20, 2012

(65) Prior Publication Data

US 2014/0024332 A1   Jan. 23, 2014

(51) Int. Cl.
*H04M 11/04*   (2006.01)
*H04W 4/12*   (2009.01)
*H04W 4/06*   (2009.01)
*H04L 12/18*   (2006.01)
(Continued)

(52) U.S. Cl.
CPC ............. *H04W 4/12* (2013.01); *H04W 4/023* (2013.01); *H04W 4/06* (2013.01); *H04W 4/021* (2013.01); *H04L 12/189* (2013.01); *H04M 1/72547* (2013.01)
USPC ................ 455/404.1; 455/404.2; 455/414.1; 455/432.1; 455/432.2

(58) Field of Classification Search
CPC ......... H04W 4/06; H04W 4/12; H04W 4/021; H04W 4/022; H04W 4/023; H04W 4/025; H04M 1/72547; H04L 12/189; H04L 12/1895
USPC ........... 455/404.1, 404.2, 414.1, 432.1, 432.2
See application file for complete search history.

(56) References Cited

U.S. PATENT DOCUMENTS 6,853,911 B1 * 2/2005 Sakarya ................. 701/455
7,415,281 B2 * 8/2008 Ahn ....................... 455/466
(Continued)

FOREIGN PATENT DOCUMENTS

WO   2004012470 A1   2/2004
WO   2009114848 A1   9/2009
(Continued)

OTHER PUBLICATIONS

3GPP TS 22.168 v1.2.1 (Jan. 2008); 3rd Generation Partnership Project; Technical Specification Group Services and System Aspects; Earthquake and Tsunami Warning System (ETWS) Requirements; Stage 1 (release 8).*
(Continued)

*Primary Examiner* — Khai M Nguyen
(74) *Attorney, Agent, or Firm* — Morris & Kamlay LLP

(57) ABSTRACT

While a mobile wireless device (102) operates in a home region (106), the mobile wireless device (102) displays public broadcast messages in accordance with the default broadcast message display settings (244) for the home region (106). In the event that the mobile wireless device (102) transits to a different region (110) for which region-specific broadcast message display settings have not already been configured, the mobile wireless device (102) queries a user to configure the broadcast message display settings (244) to be used for the new region (110). The display settings for a given region may be stored such that when the mobile wireless device (102) enters a region previously visited, the previously-configured display settings for the previously-visited region may be automatically implemented without user prompting.

19 Claims, 5 Drawing Sheets

(51) Int. Cl.
*H04M 1/725* (2006.01)
*H04W 4/02* (2009.01)

(56) References Cited

U.S. PATENT DOCUMENTS

| | | |
|---|---|---|
| 8,027,659 B1 | 9/2011 | Daly et al. |
| 2002/0123333 A1* | 9/2002 | Sato ........................ 455/415 |
| 2005/0037728 A1 | 2/2005 | Binzel et al. |
| 2005/0261012 A1 | 11/2005 | Weiser |
| 2006/0223528 A1 | 10/2006 | Smith |
| 2009/0239554 A1 | 9/2009 | Sammour et al. |
| 2010/0081464 A1* | 4/2010 | Qu et al. .................... 455/466 |
| 2010/0099439 A1 | 4/2010 | Aghili et al. |
| 2010/0174779 A1* | 7/2010 | Weiser et al. ............... 709/203 |
| 2010/0211972 A1 | 8/2010 | Howarter et al. |
| 2012/0036529 A1 | 2/2012 | McClenny et al. |
| 2014/0248849 A1* | 9/2014 | Kirchmeier et al. ....... 455/404.1 |

FOREIGN PATENT DOCUMENTS

| | | |
|---|---|---|
| WO | 2010054378 A1 | 5/2010 |
| WO | 2011066938 A1 | 6/2011 |

OTHER PUBLICATIONS

Patent Cooperation Treaty, "PCT Search Report and Written Opinion of the International Searching Authority" for International Application No. PCT/US2013/049509, Sep. 23, 2013, 11 pages.

3rd Generation Partnership Project, "Technical Specification Group Services and System Aspects; Earthquake and Tsunami Warning System (ETWS) Requirements; Stage 1 (Release 8)" 3GPP TS 22.168 V1.2.1 (Jan. 2008), 12 pages.

3rd Generation Partnership Project (3GPP), "Technical Specification Group Services and System Aspects; Public Warning System (PWS) Requirements (Release 11)", 3GPP TS 22.268 V11.4.0, Mar. 2012, 15 pages.

3rd Generation Partnership Project (3GPP), "Technical Specification Group Core Network and Terminals; Alphabets and Language-Specific Information (Release 10)", 3GPP TS 23.038 V10.0.0, Mar. 2011, 56 pages.

3rd Generation Partnership Project (3GPP), "Technical Specification Group Core Network and Terminals; Technical Realization of Cell Broadcast Service (CBS) (Release 11)", 3GPP TS 23.041 V11.3.0, Jun. 2012, 62 pages.

3rd Generation Partnership Project (3GPP), "Technical Specification Group GSM/EDGE Radio Access Network; Short Message Service Cell Broadcast (SMSCB) support on the Mobile Radio Interface (Release 10)", 3GPP TS 44.012 V10.0.0, Mar. 2011, 14 pages.

A3M Mobile Personal Protection GmbH, "Tsunami Alarm System: High technology, reliable information, easy to use", http://www.tsunami-alarm-system.com/en/tsunami-alarm-system/tsunami-alarm-system.html#ce_522, downloaded from internet Jul. 18, 2012, 2 pages.

3rd Generation Partnership Project (3GPP), "Technical Specification Group Core Network and Terminals; UICC-terminal interface;Physical and logical characteristics (Release 10)", 3GPP TS 31.101 V10.0.1 Jun. 2011, 35 pages.

3rd Generation Partnership Project (3GPP), "Technical Specification Group Core Network and Terminals; Characteristics of the Universal Subscriber Identity Module (USIM) application (Release 11)", 3GPP TS 31.102 V11.2.0, Jun. 2012, 228 pages.

* cited by examiner

CONFIGURATION OF DISPLAY SETTINGS FOR BROADCAST MESSAGING WHILE ROAMING

FIELD OF THE DISCLOSURE

The present disclosure relates generally to wireless communications and more particularly to public warning system messaging and other broadcast messaging in wireless cellular communication systems.

BACKGROUND

Many wireless cellular serving networks support Public Warning System (PWS) messaging, which enables the broadcast of local, national, and multinational alert messages to mobile wireless devices of users within corresponding regions. The mobile wireless devices typically are preconfigured to default settings with respect to such messages. However, the default settings often are different between regions. For example, the regulations in one region may require that PWS messages be displayed by default (e.g., opt out), whereas another region may require the display of PWS messages to be suppressed by default (e.g., opt in). While a mobile wireless device may implement a setting feature that allows a user to manually reconfigure these settings, users typically are unaware of this setting feature, and even if aware, often can be lax in changing the PWS messaging settings in response to changed circumstances.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
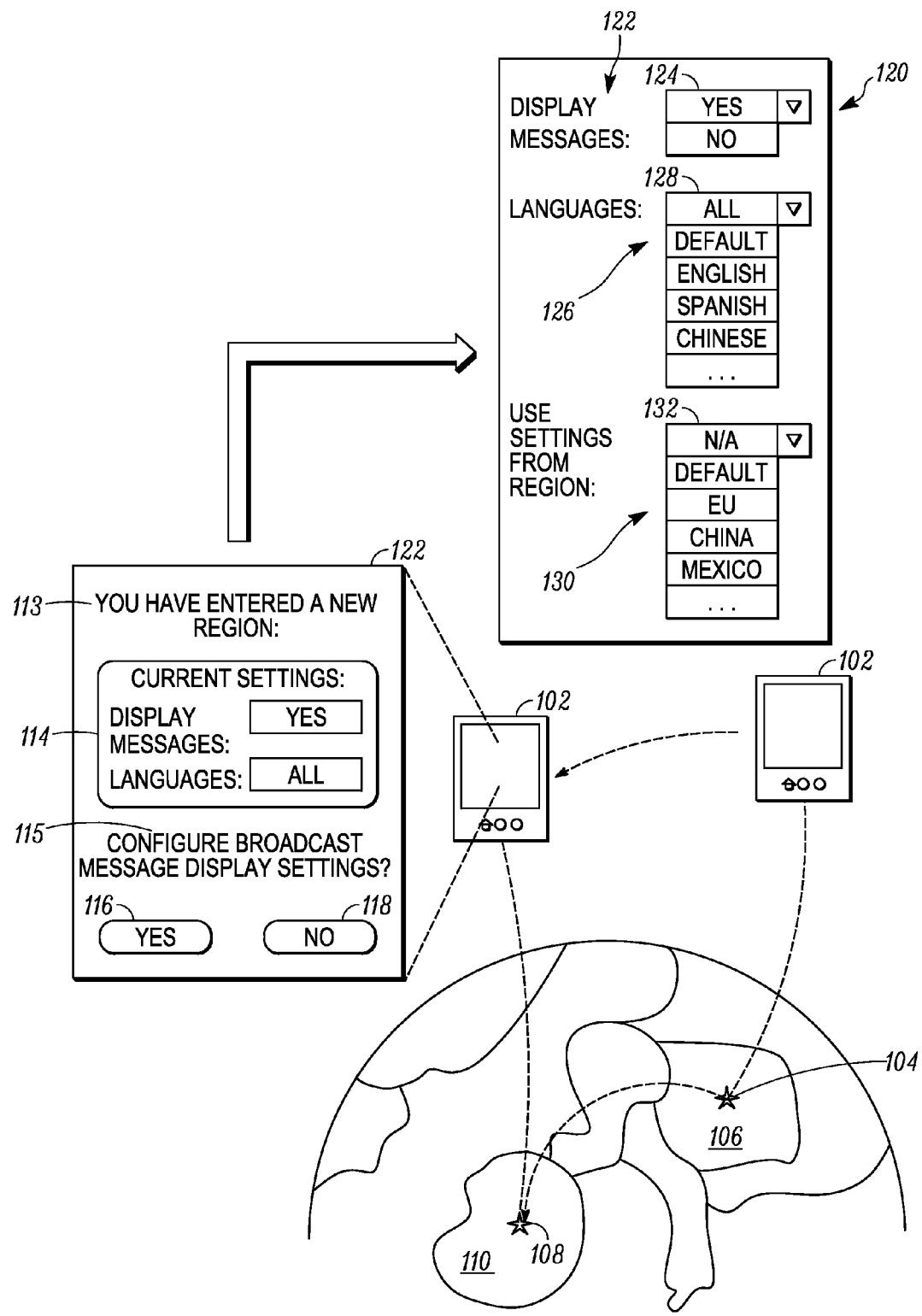
FIG. 1 is a diagram illustrating an example technique for prompting a user to configure display settings for broadcast messages in response to an inter-region transition in accordance with at least one embodiment of the present disclosure.

The following description is intended to convey a thorough understanding of the present disclosure by providing a number of specific embodiments and details involving user configuration of display settings for Public Warning System (PWS) and other public broadcast messages at a mobile wireless device in response to an inter-region transition of the mobile wireless device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the invention for its intended purposes and benefits in any number of alternative embodiments, depending upon specific design and other needs.

FIGS. 1-4 illustrate example techniques for automatically prompting user input to reconfigure broadcast message display settings at a mobile wireless device in response to a transition of the mobile wireless device from one region to another region (referred to herein as an "inter-region transition" or "inter-region transit"). While a mobile wireless device operates in a home region, the mobile wireless device operates to display broadcast messages originating in the home region in accordance with the default broadcast message display settings for the home region, such as those pre-provisioned or previously configured over-the-air by the home service provider, or as previously configured by the user. In the event that the mobile wireless device transits to a different region for which the mobile wireless device has not already been configured, the mobile wireless device automatically queries the user to configure the broadcast message display settings to be used for the new region.

Such settings can include, for example, a setting on whether to display all broadcast messages or to suppress the display of all broadcast messages, a settings for language preferences, such as 'display messages only in certain languages' or 'display messages unless in certain languages', settings to limit the display of broadcast messages based on time of day, day of the week, or type of message, and the like. The broadcast message display settings for a given region may be stored such that when the mobile wireless device enters a region previously visited, the previously-configured display settings may be automatically implemented without user prompting. These settings may be stored at the mobile wireless device, stored by one or more cellular serving networks, or stored in association with a user account accessible through the Internet or other data network. Using this technique, region-by-region custom broadcast display message settings may be configured for a user without relying on the user to remember to manually reconfigure settings for each new region entered, or even to note that the user has entered a new region (which may not be readily apparent to the user).

For ease of illustration, techniques of the present disclosure are described in the context of Public Warning System (PWS) messages, such as those promulgated by the $3^{rd}$ Generation Partnership Project (3GPP) Technical Specification (TS) 22.268 ("Public Warning System (PWS) Requirements"). Systems implementing the PWS messaging scheme include, for example, the Commercial Mobile Alert System (CMAS) within the United States of America, the EU-ALERT system within the European Union, and the Korean Public Alert System (KPAS) within the Republic of Korea. However, these techniques are not limited to PWS messages, but instead are intended to be implementable for any of a variety of broadcast messages originated in the corresponding region, such as cell broadcast messages compliant with 3GPP TS 23.041 ("Technical realization of Cell Broadcast Service (CBS)") or other broadcast message standards for wireless wide area networks (WWANs) and other cellular networks. Moreover, while the techniques of the present disclosure are described primarily in the context of countries as regions, these techniques are equally applicable to other types of regions. For example, a region can include a local geographical area, such as one or more cells of a cellular serving network. A region can include the geographical area administered by a government (e.g., a township, a county or province, or a nation) and in which one or more cellular serving networks operate subject to regulation by the government. A region also can include one or more other regions, such as a group of geographical areas administered by corresponding governments (e.g., a group of nations such as the European Union or the African Union) and which may be subject to a common or harmonized cellular regulation environment. A region also may be an area serviced by a particular mobile telephony operator or group of mobile telephony operators.

FIG. 1 illustrates a scenario for automated user-prompting for configuring broadcast message display settings for a mobile wireless device 102 in accordance with at least one embodiment of the present disclosure. The mobile wireless device 102 includes a mobile terminal or other user equipment, such as a cellular phone or other cellular-telephony-enabled computing device. In the depicted example, the mobile wireless device 102 initially operates at a location 104 within a region 106, which can include, for example, the home country of the user of the mobile wireless device 102. Accordingly, the mobile wireless device 102 conducts cellular telephony signaling with one or more cellular serving networks within range of the mobile wireless device 102. As part of this signaling, cellular serving networks within region 106 may broadcast PWS messages or other broadcast messages originated in the home region 106 to associated mobile wireless devices. When the mobile wireless device 102 receives one of these broadcast messages, the mobile wireless device 102 selectively displays the message content of the received broadcast message based on display parameters represented by one or more broadcast message display settings set for the region 106. As the region 106 is the home region in this example, the wireless mobile wireless device 102 may use the default message display settings configured for the mobile wireless device 102. These default message display settings may have been pre-provisioned when the mobile wireless device was first supplied to the user, or they may have been updated or otherwise configured through an over-the-air update by, for example, the user's mobile carrier. Alternatively, the message display settings used while in the home region may be those previously configured by the user through a user-navigable interface, as described below.

Subsequently, the user and the mobile wireless device 102 travel to a location 108 in different region 110. In this example, the region 110 is another country. The mobile wireless device 102 can identify that it has entered a new region in any of a variety of ways. In certain instances whereby the mobile wireless device was out of contact with a cellular serving network (e.g., while powered-off or out of range of any cellular serving network during transit), the mobile wireless device 102 may detect that it is in the region 110 during its search for a cellular serving network. Alternatively, the transition into region 110 may be detected during an intersystem handoff of the mobile wireless device 102. In a country-as-region implementation, the inter-region transition may be detected based on the International Telecommunications Union (ITU) Mobile Country Code (MCC) supplied by a cellular serving network in the region 110, based on a global positioning system (GPS)-indicated location of the mobile wireless device 102, and the like. Techniques for detecting the transition to a new region are described in greater detail below.

In response to determining that it has changed regions, the mobile wireless device 102 searches stored settings to determine whether broadcast message display settings were previously configured for the region 110. If so, the mobile wireless device 102 can automatically implement these previously-configured settings while operating in the region 110 without prompting the user. However, in this example, it is assumed that this is the first time the user has entered region 110 with the mobile wireless device 102 and thus the user did not previously configure broadcast message display settings for region 110. Accordingly, in response to determining that settings are not configured for region 110, the mobile wireless device 102 displays a user prompt 112 to query whether the user wants to configure broadcast message display settings for the region 110. The user prompt 112 provides a user-navigable interface, which can take any of a variety of forms, such as a graphical user interface (GUI) generated by the operating system (OS) of the mobile wireless device 102 and displayed at a display of the mobile wireless device 102, or as the loading of a webpage in a web browser displayed by the mobile wireless device 102. The user prompt 112 may make use of text-based input or user-selection of selectable icons (e.g., through manipulation of a touch screen or cursor input or voice command) to capture the user's responses to queries for various display setting options.

In the depicted example, the user prompt 112 includes a text region 113 to display a message notifying the user that the user has entered a new region, a current settings region 114 to inform the user of the default or current settings region in the new region (which may include, for example, either the settings of the last region visited or the default settings for the mobile wireless devices home region), and a text region 115 querying whether the user would like to configure broadcast display settings for the region. The user prompt 112 further can include user-selectable icons or other graphical features to capture the user's instructions in response to the query, such as a user-selectable "yes" button 116 and a user-selectable "no" button 118. In the event that the user selects the "no" button 118, the mobile wireless device 102 can utilize broadcast message display settings shown in the current settings region 114 for the mobile wireless device 102. Otherwise, in the event that the user selects the "yes" button 116, the mobile wireless device 102 then displays a user prompt 120 to enable the user to select various options for the broadcast message display settings for the region 110.

As with the user prompt 112, the user prompt 120 includes a user-navigable interface that can take any of a variety of forms and may utilize one more sequences of prompt screens for various user-selectable options. In the depicted example, the user prompt 120 includes a display query 122 for whether the user would like for broadcast messages originating in region 110 to be displayed. The display query 122 can include a user-manipulable input 124 to capture the user's instructions in this regard, where the user-manipulable input 124 can include, for example, a pull-down list, a set of "yes" and "no" buttons, a toggle or slider switch, and the like. In the event that the user provides input indicating no broadcast messages are to be displayed (e.g., selects "no" from the pull-down list), the mobile wireless device 102 registers the broadcast message display settings for the region 110 as "no display" and terminates display of the user prompt 120.

In many instances, the languages used for broadcast messages in region 110 may differ from the languages used for broadcast messages in the user's home region. The user therefore may wish to tailor the display of messages based on the user's ability to interpret the languages used in the messages. For example, a traveler who speaks only English may wish to limit the display of public messages while in the European Union to only those that are in English as the user likely would not understand public broadcast messages in other languages.

Accordingly, in the event that the user provides input indicating that broadcast messages are to be displayed (e.g., selects "yes" from the pull-down list), a language query 126 of the user prompt 120 may be enabled so as to permit the user to select which languages are enabled for display of public broadcast messages received in region 110. The language query 126 can include a pull-down list or other user-manipulable input 128 to capture the user's instructions on which languages are to be permitted. In one embodiment, the mobile wireless device 102 may have information that identifies the languages which are used for public broadcast messages in the region 110 and thus pre-populate the pull-down list with only the identified languages. Moreover, the pull-down list may be configured with the user's preferred or default language (e.g., by placing the user's preferred language at the top of the list), whereby the user's preferred or default language can be identified through, for example, an Elementary File—Language Preference ($EF_{LP}$) file or an Elementary File—Language Identification ($EF_{LI}$) file of a Universal Subscriber Identity Module (USIM) of the mobile wireless device 102.

Alternatively, the pull-down list may be populated with the same list of languages regardless of the particular languages used in a region. In an alternative embodiment, the language query 126 can be used to expressly select those languages which are specifically disabled for display, rather than to expressly select those languages which are specifically enabled for display. After the user has made the language selections via language query 126, the mobile wireless device 102 registers the broadcast message display settings for the region 110 as "display for selected languages" and "selected languages= . . . " (which may include "any language") and terminates display of the user prompt 120.

As an alternative to having the user provide separate input for each display setting, the user prompt 120 can provide the user an option to apply the same broadcast message display settings from a previously-configured region to the new region. Thus, in the depicted example, the user prompt 120 further can include a display query 130 for whether the user would like for apply the broadcast display settings previously configured for another region to the new region. The display query 130 can include a user-manipulable input 132 to capture the user's instructions in this regard, where the user-manipulable input 132 can include, for example, a pull-down list of regions available for selection, a set of buttons, one for each region, and the like. The display query 130 further can include a display of the broadcast message display settings (not shown) for the region selected in the user-manipulable input 132. In the event that the user provides input selecting a previously-configured region, the mobile wireless device 102 accesses the broadcast message display settings for the selected region from a local data store and registers the accessed broadcast message display settings as the broadcast message display settings to be used for the region 110 as well.

Although particular examples are described above, the user prompts displayed to obtain user input for the broadcast display settings for the region 110 can provide other user-selectable options without departing from the scope of the present disclosure. For example, the user prompts can present a user-navigable interface to provide user-selectable options regarding limiting the display of broadcast messages based on time of day, day of the week, type of message, urgency or priority (in the event that the public message broadcast system implements different message priorities), as well as parameters regarding the characteristics of the messages when displayed, such as the font size, color, position on the display, sounds or other audible alerts accompanying the display of the public broadcast message, and the like. Moreover, rather than require the user to navigate through all display setting options each time a new region is encountered, the user prompt can include a query that permits the user to apply the broadcast message display settings for another region as the broadcast message display settings for region 110. For example, an Italian-speaking user may feel sufficiently comfortable in understanding the "gist" of a public broadcast message in Portuguese so as to set the same settings the user has already configured for a region representing Italy to a region representing Portugal.

After the mobile wireless device 102 has obtained the user's input for the broadcast message display settings, any broadcast messages originating in region 110 and received by the mobile wireless device 102 are filtered and formatted for display in accordance with these broadcast message display settings. In the event that the user and the mobile wireless device 102 leave the region 110 and then return to the region 110 or in the event that the mobile wireless device 102 is powered-down and then restarted again while in region 110, the mobile wireless device 102, in one embodiment, can automatically implement these settings again for the region 110. Alternatively, the mobile wireless device 102 can display a user prompt to query whether the user wants to maintain the settings previously set for the region, or reconfigure the settings anew in accordance with the process described herein.

Figure 2:
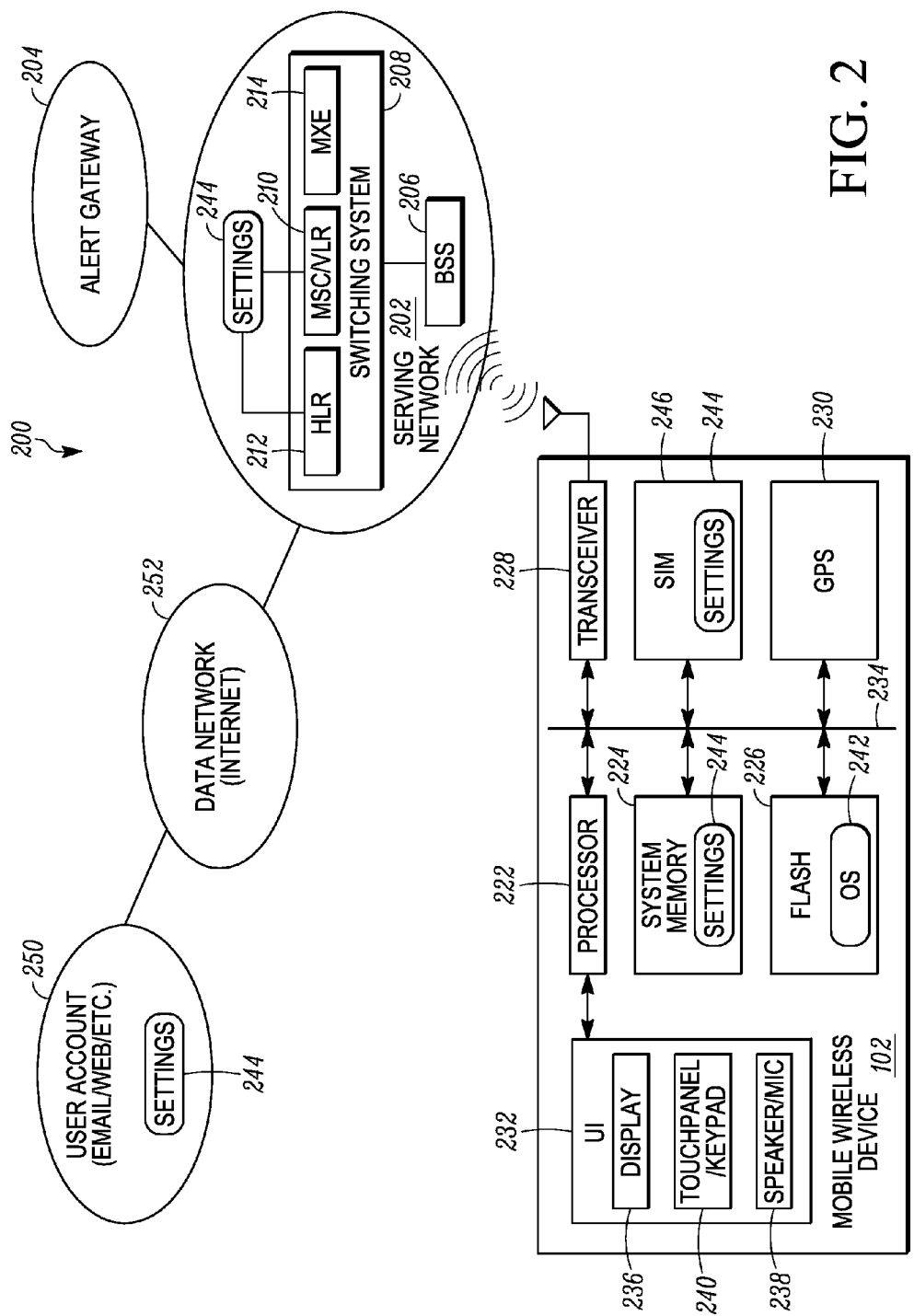
FIG. 2 is a diagram illustrating a mobile wireless device and a supporting network system for a region in accordance with at least one embodiment of the present disclosure.

FIG. 2 illustrates an implementation of the mobile wireless device 102 and a supporting network 200 for broadcast messaging in accordance with at least one embodiment of the present disclosure. The supporting network 200 includes a cellular serving network 202 connected to an alert gateway 204. The cellular serving network 202 includes a wireless telephony cellular serving network to provide cellular telephony and cellular data service to wireless telephony devices, such as mobile wireless device 102, within its signal range. The cellular serving network 202 may comply with one or more digital telephony standards, including, for example, a Global System for Mobile Communication (GSM) standard, a Universal Mobile Telecommunications System (UMTS) standard, or a Long Term Evolution (LTE) standard.

In the depicted example, the cellular serving network 202 implements one or more base station systems (BSS) 206 and a switching system 208. Each BSS 206 handles the radio frequency (RF) interfacing with the wireless devices in one or more corresponding cells, as well as handling handover, cell configuration, and control of the one or more RF transceivers. The switching station 208 includes a mobile services switching center (MSC)/visitor location register (VLR) 210, a home location register (HLR) 212, and a message center (MXE) 214. The MSC/VLR 210 performs the telephony switching functions of the cellular serving network by controlling calls and other signaling between the wireless devices and data systems, as well as interfacing with other cellular serving networks and data networks. The HLR 212 includes a database that permanently stores information for subscribers associated with the cellular serving network 202, including subscribers' service profiles, location information, and activity status. The MSC/VLR 210 also includes a VLR database that maintains information about subscribers used by the MSC/VLR 210 to service roaming visitors. The MXE 214 provides integrated voice, fax, and data messaging, including short message service, cell broadcast messaging, voice mail, email, and system notifications.

The alert gateway 204 is a gateway to the cellular serving network 202 and other cellular serving networks in the region that is used by a government entity or other public entity of the region to issue public broadcast messages to the cellular serving networks of the region, which then broadcast the messages to their subscriber and visitor devices. For example, the Commercial Mobile Alert System (CMAS) implemented by the United States of America provides for certain federal agencies, such as the National Weather Service (NWS) and the Federal Emergency Management Agency (FEMA), to issue CMAS messages to wireless carriers for broadcast on their respective wireless networks. The public broadcast messages can take the form of, for example, a Simple Message Service-Cell Broadcast (SMS-CB) format as promulgated by, for example, the 3GPP TS 23.041 and 44.012 standards.

In operation related to public broadcast messaging, a regional entity issues a broadcast message to the cellular serving network 202 via the alert gateway 204. In response, the MXE 214 prepares a cell broadcast message, which is then supplied to each BSS 206 in the cellular serving network 202 for cell broadcast to the wireless devices served by the cellular serving network 202. The mobile wireless device 102 receives the public broadcast message and selectively displays the received public broadcast message based on the display parameters defined by the broadcast message display settings configured for the region in which the mobile wireless device 102 is operating, as described in greater detail herein.

In the depicted example, the mobile wireless device 102 includes a processor 222 (e.g., a central processing device or CPU), one or more memories, such as system memory 224 and flash memory 226, a wireless communication interface 228, a GPS device 230, and a user interface (UI) 232 connected via one or more busses 234 or other interconnects. The wireless communication interface 228 includes a radio frequency (RF) transceiver configured to establish a wireless connection with a corresponding wireless telephony cellular serving network, such as cellular serving network 202 of supporting network 200. For example, the wireless communication interface 228 can include a transceiver compatible with one or more conventional cellular standards and therefore capable of communicating with any of a variety of wireless wide area networks (WWANs) including, for example, code division multiple access (CDMA)-based networks, global system for mobile communication (GSM)-based networks, time division multiple access (TDMA)-based networks, universal mobile telecommunications system (UMTS)-based networks, LTE-based networks, and the like.

The UI 232 includes, for example, a display device 236 and a speaker/microphone device 238. The display device 236 includes a display and a display controller for processing image data received from the processor 222. The speaker/microphone device 238 includes a digital-to-analog converter (DAC) and a speaker for outputting audio information from the processor 222 and a microphone and an analog-to-digital converter (ADC) for providing audio information to the processor 222. The user interface 232 further includes keys, buttons, switches, and other user-manipulated input devices, such as a keypad or touch panel 240, to receive input from a user for processing at the processor 222.

The GPS device 230 includes a GPS antenna system or other location determination device for determining a location of the mobile wireless device 102 and providing a representation of the location to the processor 222. The processor 222, in turn, can use the location information to determine a region in which the mobile wireless device 102 is located by comparing the location with the boundaries of one or more regions.

The processor 222 executes a set of instructions stored at a computer readable medium, such as the flash memory 226, whereby the set of instructions represent an operating system (OS) 242 or other software application. The OS 242 manipulates the processor 222 to initiate and conduct telephone calls and data communications, provide visual information via the display device 236, respond to user input via the user interface 232, and the like. Further, in one embodiment, the OS 242 manipulates the processor 222 to display user-navigable interfaces, such as GUIs, representing user prompts related to configuring public broadcast message display settings, as well as to selectively display PWS messages and other broadcast messages in accordance with these settings, as described herein. In an alternate embodiment, some or all of the exemplary techniques described herein are implemented, in whole or in part, as hardware components of the mobile wireless device 102.

In one embodiment, the OS 242 is configured to manipulate the processor 222 to process PWS messages and other broadcast messages received from the cellular serving network 202 for display in accordance with broadcast message display settings 244 available to the mobile wireless device 102, either in association with the user or in association with the device itself. As part of this region-based selective display process, the OS 242 can display all broadcast messages received in the region, suppress display of all broadcast messages received in the region, determine one or more characteristics of the each broadcast message (e.g., language, time, day, priority, or type) and display only those broadcast messages having characteristics permitted for display, and the like. The OS 242 also is configured to manipulate the processor 222 to provide a GUI or other user-navigable interface to obtain user input to initially configure, or reconfigure, the broadcast message display settings 244 associated with a region that has not been previously configured by the user. An example method for soliciting user input to configure broadcast message display settings for a region is described below with reference to FIG. 3. An example method for controlling the display of PWS messages and other broadcast messages based on the broadcast message display settings for a region is described below with reference to FIG. 4.

In one embodiment, the broadcast message display settings 244 are stored in system memory 224 or flash memory 226. In another embodiment, the broadcast message display settings 244 may be stored in a non-volatile removable memory module, such as subscriber identity module (SIM) card 246 or a Universal Integrated Circuit Card (UICC), so that a user's broadcast message display preferences may be easily transferred between mobile wireless devices. In yet another embodiment, the broadcast message display settings 244 may be stored remotely and downloaded to the mobile wireless device 102 when in use. To illustrate, the broadcast message display settings 244 may be stored at the HLR 212 or the MSC/VLR 210 of the home cellular serving network of the mobile wireless device 102 such that the broadcast message display settings 244 may be downloaded to the mobile wireless device 102 whenever it is turned on or downloaded from the home cellular serving network on a scheduled basis (e.g., via an over-the-air update) so as to periodically refresh the settings. In the event that the mobile wireless device 102 is roaming on a non-home cellular serving network, the non-home cellular serving network can request the broadcast message display settings 244 from the home cellular serving network for provision to the mobile wireless device 102. Moreover, a serving network may update or otherwise modify the broadcast message display settings 244 on an as-needed basis without requiring the user's involvement.

As another example, the broadcast message display settings 244 may be stored in association with the user's account 250 at a service provider accessible to the mobile wireless device 102 via the cellular serving network 202 and a data network 252 (e.g., the Internet). The service provider can be, for example, a web-based service provider of email services, social networking services, and the like. In this instance, the OS 242 may be provided user credentials so as to access the user's account 250 at the service provider and download the broadcast message display settings 244 from the user's account 250 in order to configure the mobile wireless device 102 to operate in accordance with the specified display settings. In this way, the user's broadcast message display preferences can be uniformly implemented across a variety of mobile wireless devices so that the user does not have to reconfigure display settings when switching between mobile wireless devices.

The broadcast message display settings information 250 may be implemented as one or more data structures, such as a table, a linked list, and the like. Table 1 below illustrates an example implementation of the broadcast message display settings:

TABLE 1

| Region | MCC(s) | Language(s) | Message IDs | Day(s) | Time(s) |
|---|---|---|---|---|---|
| USA | 310, 311, 312, 313, 314, 315, 316 | English, Spanish | ALL | ALL | ALL |
| Brazil | 724 | !Portuguese | 4353 | ALL | 0600-2000 |
| China | 460, 461 | — | — | — | — |
| Scandinavia | 238 (DK), 242 (NO), 240 (SE) | English, Swedish | ALL | M-F | 0800-1700 |
| France | 208 | NONE | NONE | NONE | NONE |

Table 1 illustrates a plurality of entries, each entry representing the broadcast message display settings for a corresponding region. Each entry includes a region identifier entry having an identifier of the region (e.g., "USA", "Brazil", "China", "Scandinavia"), a Mobile Country Code (MCC) field to identify the MCCs associated with the region, the languages permitted for display (or languages suppressed for display), a message identifier (ID) field to identify the PWS message identifier values (that is, the message type) either to be permitted for display or suppressed for display, a Day field to identify the day(s) of the week permitted for display, and a time field to identify the times of day permitted for display. For Table 1, the attribute "!" signals a message characteristic that suppresses display. For example, the "!Portuguese" setting for the Brazil region entry indicates that the display of PWS messages in the Portuguese language are to be suppressed.

In the example of Table 1, the USA is the home region, and the broadcast message display settings for this region are configured so as to permit the display of PWS messages in the English or Spanish language, regardless of message type, day of week, or time of day. Brazil is a roaming region in this example, and the broadcast message display settings for Brazil are configured to permit the display of PWS messages in languages other than Portuguese, and which are of type 4353 (Tsunami Warning Message Type), and so long as they are received between 6 AM and 8 PM local time. China also is a roaming region, and in this example the user has not yet configured broadcast message display settings for China, as indicated by the "—" indicator in the corresponding fields. Scandinavia is a roaming region that includes multiple regions, namely Denmark, Sweden, and Norway, and the broadcast message display settings for this multi-region entry permits the display of PWS messages of any type so long as they are in English or Swedish and are received between 8 AM and 5 PM local time Monday through Friday. The last region represented in the example of Table 1 is France, which is configured to suppress the display of all PWS messages, as indicated by the use of the value "NONE" in the corresponding fields.

Figures 3, 3A, 3B:
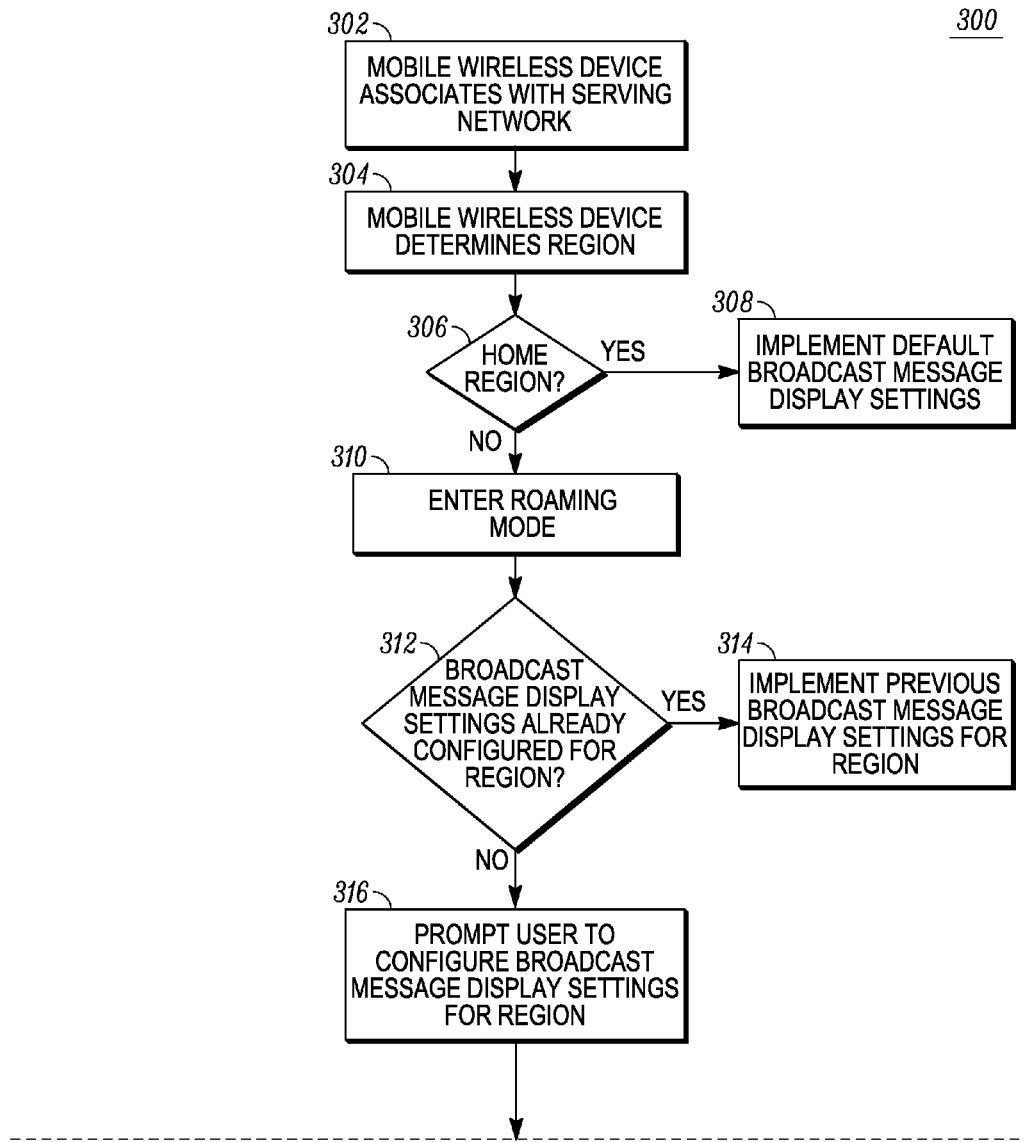
FIG. 3 is a flow diagram illustrating a method of configuring broadcast message display settings at a mobile wireless device in accordance with at least one embodiment of the present disclosure.
Figure 3B:
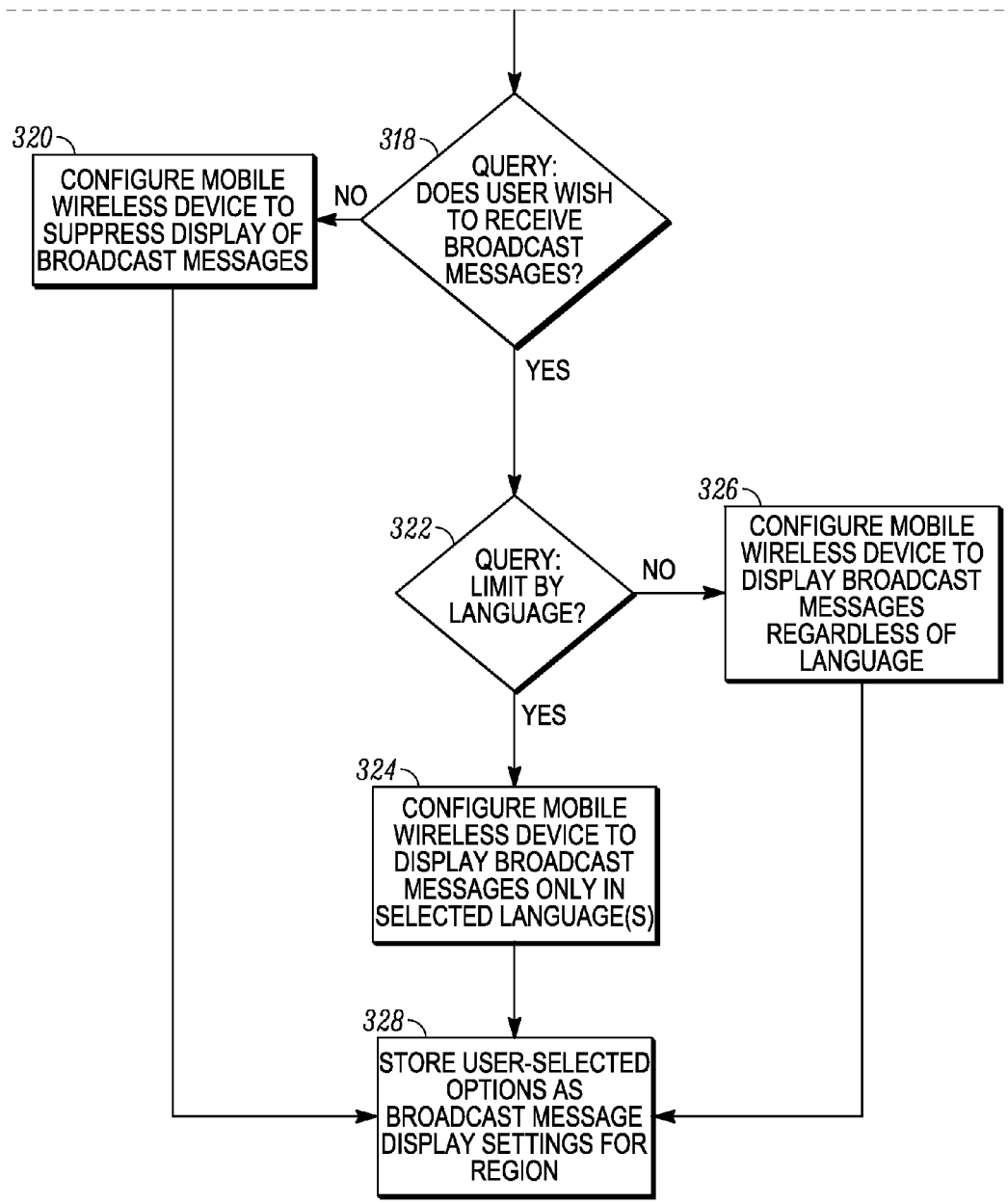

FIG. 3 illustrates an example method 300 of operation of the mobile wireless device 102 (FIG. 1) for configuring broadcast message display settings for PWS messages or other types of broadcast messages in accordance with at least one embodiment of the present disclosure. The method 300 initiates at block 302, whereupon the mobile wireless device 102 associates with a cellular serving network, such as cellular serving network 202 of FIG. 2. This association may result from an identification of the cellular serving network from a public land mobile network (PLMN) search conducted by the mobile wireless device 102 after powering up or after exiting a low-power mode. Alternatively, this association may result from an intersystem handoff as the mobile wireless device 102 leaves the coverage area of one cellular serving network and enters the coverage area of another.

At block 304, the mobile wireless device 102 determines the region in which the mobile wireless device 102 is located. The International Telecommunications Union (ITU) has assigned each country has one or more unique Mobile Country Codes (MCCs), and the PLMN ID of a cellular serving network typically includes the MCC of the country in which the cellular serving network operates. Accordingly, in implementations whereby the regions are defined on a country-by-country basis, the mobile wireless device 102 can determine the region based on the MCC of the PLMN ID provided by the cellular serving network during the association process of block 302. For example, the MCC assigned to Brazil is 724, and thus the mobile wireless device 102 can determine it is in Brazil responsive to receiving from the cellular serving network a PLMN ID with a MCC of 724. Other location identifiers may be used instead of, or in addition to, the MCC. The GPS coordinates supplied by the GPS device 230 (FIG. 2) can be used to identify the geographical position of the mobile wireless device 102, and thus the region in which the mobile wireless device 102 is located.

At block 306, the mobile wireless device 102 determines whether the current region is the home region of the mobile wireless device 102. Many wireless cellular networks, including GSM-, UMTS- and LTE-based networks, assign each subscriber an International Mobile Subscriber Identity (IMSI) value, which is typically stored on removable memory module, such as the SIM card 246 of FIG. 2, implemented in the user's mobile wireless device. This IMSI value includes the MCC of the home country of the subscriber. Accordingly, in one embodiment the mobile wireless device 102 compares the MCC received as part of the PLMN ID provided by the cellular serving network with the MCC included as part of the IMSI value stored on the SIM card 246 to determine whether the cellular serving network is in the home country/region of the subscriber. Certain countries, such as the USA and India, have more than one MCC, and a region having multiple countries would have multiple MCCs. Accordingly, for country-based regions, the comparison of the MCC of the IMSI value typically is conducted for each of the MCCs for the country or multi-country region associated with the MCC of the PLMN ID of the cellular serving network.

In the event that the mobile wireless device 102 determines that the current region is the home region (e.g., there is a match (or group match) between the MCC of the IMSI and a MCC of the country identified by the MCC supplied by the cellular serving network), at block 308 the mobile wireless device 102 implements the default broadcast message display settings or otherwise implements the broadcast message display settings associated with the home region. Returning to block 306, if the current region is not the home region, at block 310 the mobile wireless device 102 enters a roaming mode at block 310.

As part of entering the roaming mode, the mobile wireless device 102 accesses the broadcast message display settings 244 (FIG. 2) to determine whether broadcast message display settings were previously configured by the user for the current region at block 312. If the broadcast message display settings 244 include previously-configured display settings for the current region, at block 314 the mobile wireless device 102 implements these settings for broadcast messages received while in the current region.

Returning to block 312, if the user has not already configured the settings for the current region, at block 316 the mobile wireless device 102 displays a user prompt or other GUI feature to notify the user that a new region has been entered and to prompt the user to configure the broadcast message display settings for the region. The display of the GUI feature to initiate the capture of user input for configuring the broadcast message display settings can be accompanied by, for example, an audible alert or a vibration to help ensure it is noticed by the user.

In certain instances, the mobile wireless device may repeatedly or frequently transit between regions. For example, the user may be located at a spot near the borders of multiple countries and thus may transit through multiple regions in a matter of minutes. In order to avoid hassling the user through frequent prompts to configure broadcast message display settings in such situations, the method 300 can include a hysteresis filter for the process represented by blocks 306, 308, 310, 314, and 316 whereby the prompting of a user for display settings configuration is suppressed if, for example, the user has been in the new region for only a short period (e.g., less than an hour), the user has passed through more than a certain number of regions in a certain number of hours, and the like.

As an initial query at block 318, the mobile wireless device 102 prompts the user to indicate whether the user desires to receive any broadcast messages while in the current region. In response to the user providing input indicating all broadcast messages are to be suppressed, at block 320 the mobile wireless device 102 configures the broadcast message display settings to suppress the display of all broadcast message originated in the current region. Returning to block 318, in response to the user providing input indicating that the display of broadcast messages is permitted, the mobile wireless device 102 can further query the user to obtain input on user-selectable options to further refine which message characteristics are to be used to permit or deny display of broadcast messages originating in the current region. For example, it may be appropriate to selectively display broadcast messages based on the language of their content, and thus at block 322 the mobile wireless device 102 can query the user as to whether broadcast messages are to be filtered based on the language of their content.

In response to the user providing input indicating that displayed broadcast messages are to be limited to only certain languages (such as those indicated by the $EF_{PL}$ or $EF_{LI}$ files of the USIM of the mobile wireless device 102), at block 324 the mobile wireless device 102 configures the broadcast message display settings 244 for the current region so that only broadcast messages in the selected languages are displayed. Returning to block 322, in response to the user providing input indicating that the displayed broadcast messages are not limited by language, at block 326 the mobile wireless device 102 configures the broadcast message display settings for the current region so that the display of broadcast messages is not limited by language. Although FIG. 3 illustrates an example directed to configuration of display filter settings based on the parameter of the language of the message content, the query process of blocks 322, 324, and 326 can be similarly implemented for other display filter criteria, such as message type, time of day, day of week, priority, and the like.

At block 328, the mobile wireless device 102 updates the corresponding region entry of the broadcast message display settings 244 to reflect the user-selected display options obtained at blocks 316, 318, 320, 322, 324, and 326. In one embodiment, the user-selected display options are stored to the broadcast message display settings 244 (FIG. 2) stored at the SIM card 246, the system memory 224, the flash memory 226 (FIG. 2), or a combination thereof. The storage process also can, for example, transmitting a representation of the user-configured settings to the cellular serving network so as to update the broadcast message display settings 244 stored at the cellular serving network, or providing a representation of the user-configured settings to another service provider so as to update the user's account 250 (FIG. 2).

Figure 4:
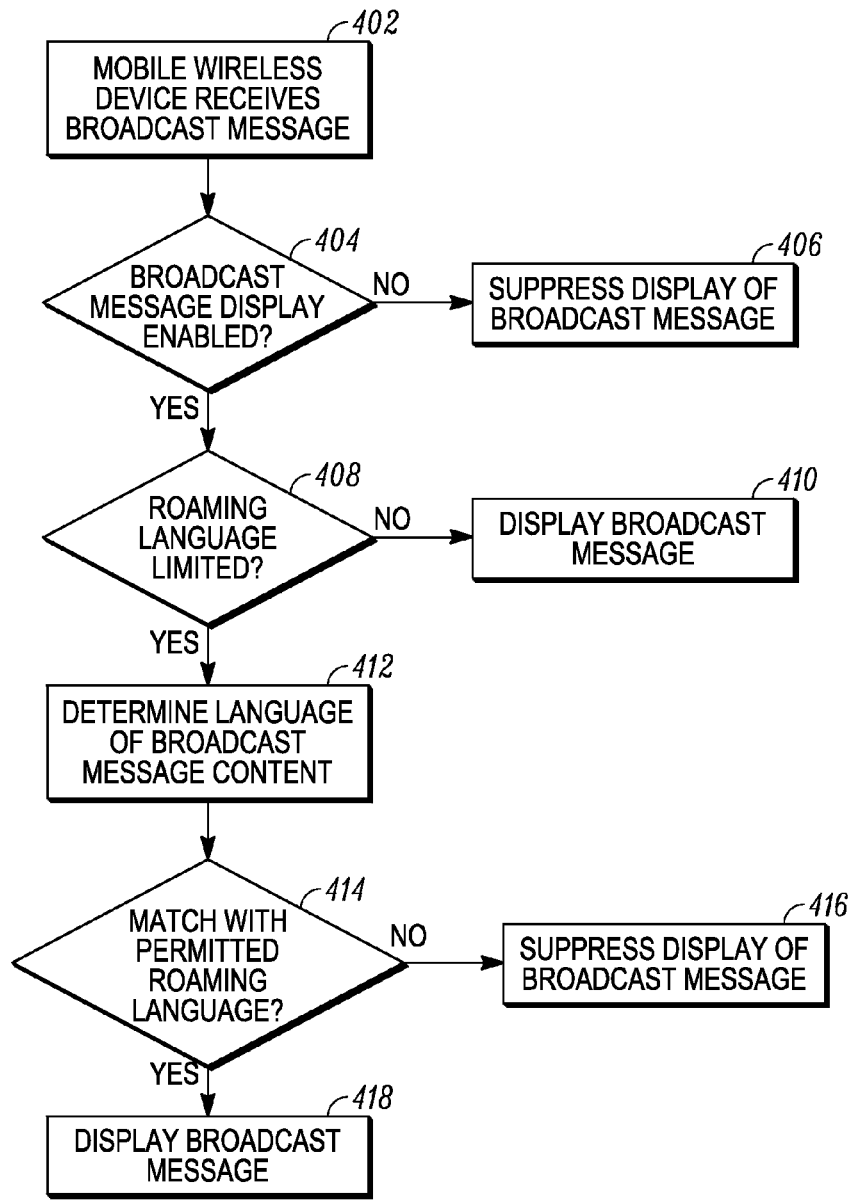
FIG. 4 is a flow diagram illustrating a method of displaying broadcast messages at a mobile wireless device in accordance with configured broadcast message display settings in accordance with at least one aspect of the present disclosure.

FIG. 4 illustrates a method 400 of selectively displaying PWS messages and other broadcast messages originating in a region in accordance with at least one embodiment of the present disclosure. Although FIG. 4 illustrates an example directed to broadcast message filtering based on the language of the broadcast message, other message characteristics of broadcast messages may be used to filter broadcast messages in addition to, or instead of, the language of the broadcast message. As noted above, broadcast messages originating in the region can be filtered for display based on, for example, the message type (identified by, for example, the PWS message identifier), time of day, day of week, size (e.g., number of alphanumeric characters), and the like.

The method 400 initiates at block 402 when the mobile wireless device 102 (FIG. 1) receives a public broadcast message from a cellular serving network (e.g., cellular serving network 202 of FIG. 2). At block 404, the mobile wireless device 102 accesses the broadcast message display settings for the region associated with the cellular serving network to determine whether the display of broadcast messages is permitted in any form. If the settings indicate that all broadcast messages are to be suppressed, at block 406 the mobile wireless device 102 suppresses display of the broadcast message.

Returning to block 404, if the broadcast display settings indicate that at least some broadcast messages originating in the region are permitted to be displayed, at block 408 the mobile wireless device 102 determines from the settings for the region whether only broadcast messages in certain languages are permitted to be displayed. If the display of broadcast messages is not limited by language, at block 410 the mobile wireless device 102 displays the broadcast message to the user.

Returning to block 408, if the display of broadcast languages is language-limited, at block 412 the mobile wireless device 102 identifies the language of the broadcast message. In one embodiment, the language of the broadcast message is indicated in one or more fields of the broadcast message. As an example, cell broadcast service (CBS) messages transmitted according to 3GPP TS 23.041 (one embodiment of a PWS message) include a field titled "Data Coding Scheme." This parameter field contains an identifier indicating the language of the CBS message. The language identifiers that may be used in this field are is provided in 3GPP TS 23.038 (clause 5). At block 414 the mobile wireless device 102 determines from the settings for the region whether the identified language is one of the permitted languages. If broadcast messages in the identified language are not permitted for display, at block 416 the mobile wireless device 102 suppresses display of the broadcast message. Returning to block 414, if the identified language is one of the languages permitted for display, at block 418 the mobile wireless device 102 displays the broadcast message to the user. Note that although FIG. 4 illustrates an example directed to the selective display of PWS messages based on the language of the message content, the message display decision process of blocks 408, 410, 412, 414, 416, and 418 can be similarly implemented for the selective display of PWS messages based on other criteria, such as message type, time of day, day of week, priority, and the like.

In accordance with one aspect of the present disclosure, a method includes associating a mobile wireless device with a first cellular serving network, the first cellular serving network associated with a first region and operable to broadcast messages originating in the first region. The method also includes displaying, at the mobile wireless device, a user prompt to configure a broadcast message display setting of the mobile wireless device for the first region responsive to the mobile wireless device determining the broadcast message display setting has not already been configured for the first region. The broadcast messages can be public warning system (PWS) messages. The broadcast message display setting can include at least one of: a setting to suppress display of all broadcast messages; a setting to limit display of a broadcast message based on a language of a content of the broadcast message; a setting to limit display of a broadcast message based on a time of transmission; a setting to limit display of a broadcast message based on a day of the week; and a setting to limit display of a broadcast message based on a type of the broadcast message.

The method also may include configuring the broadcast message display setting for the first region at the mobile wireless device based on user input received responsive to the user prompt. The method further can include receiving, at the mobile wireless device, a broadcast message from the first cellular serving network, determining at least one characteristic of the broadcast message, displaying the broadcast message at the mobile wireless device responsive to the broadcast message display setting for the first region permitting display of broadcast messages having the at least one characteristic, and suppressing display of the broadcast message at the mobile wireless device responsive to the broadcast message display setting for the first region denying display of broadcast messages having the at least one characteristic. The method further can include accessing broadcast message display settings for one or more regions from a network-based user account and storing the accessed broadcast message display settings at the mobile wireless device.

In one aspect, the region is a country, and determining the broadcast message display setting has not already been configured for the region includes determining that a table of broadcast message display settings does not already have a user-configured broadcast message display setting in an entry associated with a country identifier provided by the first cellular serving network. The country identifier can include an International Telecommunication Union (ITU) mobile country code (MCC).

In one aspect, the method further includes associating the mobile wireless device with a second cellular serving network subsequent to associating the mobile wireless device with the first cellular serving network, the second cellular serving network associated with a second region and operable to broadcast messages originating in the second region, as well as reconfiguring, without user input, the mobile wireless device to implement a broadcast message display setting for the second region responsive to the mobile wireless device determining the broadcast message display setting for the second region has already been configured. In one embodiment, the second region is a home region of the mobile wireless device, and reconfiguring the mobile wireless device includes reconfiguring the mobile wireless device to a default broadcast message display setting.

In accordance with another aspect of the present disclosure, a mobile wireless device includes a wireless interface to communicate with a cellular serving network, a display, a processor coupled to the wireless interface and the display, and a first memory coupled to the processor. The memory is to store a set of executable instructions. The set of executable instructions is to manipulate the processor to determine a region associated with the cellular serving network and to provide for display of a user prompt to configure a broadcast message display setting for broadcast messages originating in the region responsive to determining the broadcast message display setting has not already been configured for the region. The mobile wireless device further can include a user interface, wherein the set of executable instructions further is to manipulate the processor to configure the broadcast message display setting based on user input received via the user interface responsive to the user prompt.

In one embodiment, the set of executable instructions further is to manipulate the processor to determine at least one characteristic of a broadcast message originating in the region, to display the broadcast message at the mobile wireless device responsive to the broadcast message display setting for the region permitting display of broadcast messages having the at least one characteristic, and to suppress display of the broadcast message at the mobile wireless device responsive to the broadcast message display setting for the region denying display of broadcast messages having the at least one characteristic.

The mobile wireless device further can include a second memory to store a table of broadcast message display settings, each entry of the table associated with a corresponding region and having a field to store a broadcast message display setting for the corresponding region, wherein the set of executable instructions is to manipulate the processor to determine the broadcast message display setting has not already been configured based on whether a user-configured broadcast message display setting is already stored at the corresponding entry for the region. The second memory can include a non-volatile removable memory module.

In one embodiment, the set of executable instructions further is to manipulate the processor to implement the broadcast message display setting without user prompting responsive to determining the broadcast message display setting has already been configured for the region. The set of executable instructions further may manipulate the processor to implement a default broadcast message display setting without user input responsive to determining the region is a home region for the mobile wireless device.

In accordance with yet another aspect of the present disclosure, a method includes associating a mobile wireless device with a first cellular serving network, the first cellular serving network associated with a first region and operable to broadcast public warning system (PWS) messages originating in the first region. The method further includes receiving, at the mobile wireless device, user input configuring a display setting for PWS messages in the first region responsive to a user prompt displayed by the mobile wireless device in response to determining the display setting was not already configured for PWS messages in the first region, the user input identifying one or more languages permitted for display. The method also includes determining a language of a PWS message received at the mobile wireless device, displaying the PWS message at the mobile wireless device responsive to one or more languages permitted for display including the language of the PWS message, and suppressing display of the PWS message at the mobile wireless device responsive to the one or more languages permitted for display not including the language of the PWS message. The method further can include associating the mobile wireless device with a second cellular serving network subsequent to associating the mobile wireless device with the first cellular serving network, the second cellular serving network associated with a second region and operable to broadcast PWS messages originating in the second region, and reconfiguring the mobile wireless device to implement a display setting for PWS messages in the second region without user prompting responsive to the mobile wireless device determining the display setting for PWS messages in the second region has already been configured.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

It will be appreciated that the methods and the user interface device described herein may include one or more conventional processors and unique stored program instructions that control the one or more processors, to implement, in conjunction with certain non-processor circuits, some of the functions of the user interface device described herein. The non-processor circuits may include, but are not limited to, wireless transmitter and receiver circuits, signal drivers, clock circuits, power source circuits, sensor circuits, and the like.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    associating a mobile wireless device with a first cellular serving network, the first cellular serving network associated with a first region and operable to broadcast messages originating in the first region;
    displaying, at the mobile wireless device responsive to the mobile wireless device determining a broadcast message display setting has not already been configured for the first region, a user prompt to configure the broadcast message display setting of the mobile wireless device for the first region;
    associating the mobile wireless device with a second cellular serving network subsequent to associating the mobile wireless device with the first cellular serving network, the second cellular serving network associated with a second region and operable to broadcast messages originating in the second region; and
    reconfiguring, without user input, the mobile wireless device to implement a broadcast message display setting for the second region responsive to the mobile wireless device determining the broadcast message display setting for the second region has already been configured.

2. The method of claim 1, wherein the broadcast messages comprise public warning system (PWS) messages.

3. The method of claim 1, wherein the broadcast message display setting comprises at least one of: a setting to limit display of a broadcast message based on a language of a content of the broadcast message; a setting to limit display of a broadcast message based on a time of transmission; and a setting to limit display of a broadcast message based on a day of the week.

4. The method of claim 1, further comprising:
    configuring the broadcast message display setting for the first region at the mobile wireless device based on user input received responsive to the user prompt.

5. The method of claim 4, further comprising:
receiving, at the mobile wireless device, a broadcast message from the first cellular serving network;
determining at least one characteristic of the broadcast message;
displaying the broadcast message at the mobile wireless device responsive to the broadcast message display setting for the first region permitting display of broadcast messages having the at least one characteristic; and
suppressing display of the broadcast message at the mobile wireless device responsive to the broadcast message display setting for the first region denying display of broadcast messages having the at least one characteristic.

6. The method of claim 1, wherein:
the first region is a country; and
determining the broadcast message display setting has not already been configured for the first region comprises determining that a table of broadcast message display settings does not already have a user-configured broadcast message display setting in an entry associated with a country identifier provided by the first cellular serving network.

7. The method of claim 1, wherein:
the second region is a home region of the mobile wireless device; and
reconfiguring the mobile wireless device comprises reconfiguring the mobile wireless device to a default broadcast message display setting.

8. The method of claim 1, further comprising:
accessing broadcast message display settings for one or more regions from a network-based user account and storing the accessed broadcast message display settings at the mobile wireless device.

9. The method of claim 1, wherein the first broadcast message display setting comprises at least one of: a setting to suppress display of all first broadcast messages; and a setting to limit display of first broadcast messages based on a type of the first broadcast message.

10. A mobile wireless device comprising:
a wireless interface to communicate with a first cellular serving network operable to broadcast first messages originating in a first region;
a display;
a processor coupled to the wireless interface and the display; and
a first memory coupled to the processor, the first memory to store a set of executable instructions, the set of executable instructions to manipulate the processor to:
determine the first region associated with the first cellular serving network; and
provide, responsive to determining a first broadcast message display setting has not already been configured for the first region, for display of a user prompt to configure the first broadcast message display setting for broadcast messages originating in the first region;
associate the mobile wireless device with a second cellular serving network subsequent to associating the mobile wireless device with the first cellular serving network, the second cellular serving network associated with a second region and operable to broadcast second messages originating in the second region; and
reconfigure, without user input and responsive to the mobile wireless device determining a second broadcast message display setting for the second region has already been configured, the mobile wireless device to implement the second broadcast message display setting for the second region.

11. The mobile wireless device of claim 10, wherein the broadcast messages comprise public warning system (PWS) messages.

12. The mobile wireless device of claim 10, further comprising:
a user input interface; and
wherein the set of executable instructions further is to manipulate the processor to configure the first broadcast message display setting based on user input received via the user input interface responsive to the user prompt.

13. The mobile wireless device of claim 12, wherein the set of executable instructions further is to manipulate the processor to:
determine at least one characteristic of at least one of the first broadcast messages originating in the first region;
displaying the at least one of the first broadcast messages at the mobile wireless device responsive to the first broadcast message display setting for the first region permitting display of broadcast messages having the at least one characteristic; and
suppressing display of the at least one of the first broadcast messages at the mobile wireless device responsive to the first broadcast message display setting for the first region denying display of broadcast messages having the at least one characteristic.

14. The mobile wireless device of claim 10, further comprising:
a second memory to store a table of broadcast message display settings, each entry of the table associated with a corresponding region and comprising a field to store a broadcast message display setting for the corresponding region; and
the set of executable instructions to manipulate the processor to determine whether a current broadcast message display setting for a currently associated cellular serving network associated with the current region has already been configured based on whether a user-configured broadcast message display setting is already stored at the corresponding entry for the current region.

15. The mobile wireless device of claim 14, wherein the second memory comprises a non-volatile removable memory module.

16. The mobile wireless device of claim 14, wherein at least the current region is a group of countries and the entry for the group of countries is associated with one or more country identifiers associated with the countries of the group.

17. The mobile wireless device of claim 14, wherein the set of executable instructions is to manipulate the processor to:
implement the current broadcast message display setting without user prompting responsive to determining the current broadcast message display setting has already been configured for the current region.

18. The mobile wireless device of claim 10, wherein the set of executable instructions further is to manipulate the processor to:
implement a default broadcast message display setting without user input responsive to determining a currently associated region is a home region for the mobile wireless device.

19. A method comprising:
associating a mobile wireless device with a first cellular serving network, the first cellular serving network associated with a first region and operable to broadcast public warning system (PWS) messages originating in the first region;

receiving, at the mobile wireless device, user input configuring a first display setting for PWS messages in the first region responsive to a user prompt displayed by the mobile wireless device in response to determining the first display setting was not already configured for PWS messages in the first region, the user input identifying one or more languages permitted for display;

determining a language of a PWS message received at the mobile wireless device;

displaying the PWS message at the mobile wireless device responsive to one or more languages permitted for display including the language of the PWS message;

suppressing display of the PWS message at the mobile wireless device responsive to the one or more languages permitted for display not including the language of the PWS message;

associating the mobile wireless device with a second cellular serving network subsequent to associating the mobile wireless device with the first cellular serving network, the second cellular serving network associated with a second region and operable to broadcast PWS messages originating in the second region; and reconfiguring the mobile wireless device to implement a second display setting for PWS messages in the second region without user prompting responsive to the mobile wireless device determining the second display setting for PWS messages in the second region has already been configured.

* * * * *